Oct. 16, 1956   J. A. STROTHER ET AL   2,766,569
MAIL TREATING AND INSERTING DEVICE
Filed Oct. 1, 1952                                  8 Sheets-Sheet 1

Oct. 16, 1956

J. A. STROTHER ET AL 2,766,569

MAIL TREATING AND INSERTING DEVICE

Filed Oct. 1, 1952

INVENTORS
John A. Strother
Francis J. Rouan
Samuel E. Calhoun
John E. Oakley

BY Edwin H. Owen ATTORNEY

Oct. 16, 1956  J. A. STROTHER ET AL  2,766,569
MAIL TREATING AND INSERTING DEVICE
Filed Oct. 1, 1952  8 Sheets-Sheet 3

INVENTORS
John A. Strother
Francis J. Rouan
Samuel E. Calhoun
John E. Oakley
BY Edwin H. Owen ATTORNEY Oct. 16, 1956  J. A. STROTHER ET AL  2,766,569
MAIL TREATING AND INSERTING DEVICE
Filed Oct. 1, 1952  8 Sheets-Sheet 4

INVENTORS
John A. Strother
Francis J. Bovan
Samuel E. Calhoun
John E. Oakley
BY Edwin H. Owen ATTORNEY Oct. 16, 1956   J. A. STROTHER ET AL   2,766,569
MAIL TREATING AND INSERTING DEVICE
Filed Oct. 1, 1952   8 Sheets-Sheet 5

INVENTORS
John A. Strother
Francis J. Rouan
Samuel E. Calhoun
John E. Oakley
BY Edwin H. Owen ATTORNEY Oct. 16, 1956  J. A. STROTHER ET AL  2,766,569
MAIL TREATING AND INSERTING DEVICE
Filed Oct. 1, 1952  8 Sheets-Sheet 6

INVENTORS
John A. Strother
Francis J. Rouan
Samuel E. Calhoun
John E. Oakley
BY Edwin H. Owen ATTORNEY

Fig. 13

United States Patent Office 2,766,569
Patented Oct. 16, 1956

2,766,569

MAIL TREATING AND INSERTING DEVICE

John A. Strother, Stamford, Francis J. Rouan, Darien, Samuel E. Calhoun, Springdale, and John E. Oakley, Stamford, Conn., assignors to Pitney-Bowes, Inc., Stamford, Conn., a corporation of Delaware Application October 1, 1952, Serial No. 312,438

9 Claims. (Cl. 53—188)

This invention relates to mail handling and particularly to the combined treatment of mailing material including sheet folding, envelope opening and inserting of the folded sheet, alone or with other matter, into the opened envelope, and closing and sealing of the envelope with the folded matter therein.

Heretofore it has been the predominant practice to perform such operations as folding sheets and opening envelope flaps in separate operations and then to assemble the mailing material on an inserting machine. Some attempts have been made to provide for sheet folding together with subsequent automatic insertion in an envelope, or envelope flap opening together with subsequent automatic insertion of matter into the opened envelope. In neither of these cases, however, have the results been particularly satisfactory.

It is an object of the present invention, therefore, to provide for combining in an automatic series the functions of sheet folding with inserting, or envelope flap opening with inserting, and to do so in a fully controlled and commercially operable fashion.

It is another object of the invention to provide for combining in an automatic series the three functions of sheet folding, envelope flap opening, and inserting in a fully controlled and commercially operable fashion.

Another object of the invention is to provide a novel method for the continuous taking from supply stacks of individual unfolded sheets and unopened envelopes with folded flaps, and obtaining therefrom assembled articles in each of which a folded sheet is enclosed in an envelope.

Still another object of the invention is to provide a novel method for the taking from supply stacks of unfolded sheets and of envelopes with folded flaps, and obtaining therefrom assembled articles in each of which a folded sheet is enclosed within an envelope and in which the envelope flap is closed and the envelope marked with a postage paid indicator.

A feature of the present invention is the arrangement of either a sheet folder, an envelope flap opener or both above the path of a horizontal conveying mechanism which moves the folded sheet to and inserts it into the envelope, the conveyor operation being timed to cooperate with the starting feeds of both the folder or flap opener or both.

Another feature of the invention is the arrangement of the sheet and envelope hoppers, folding and flap opening elements, and the like to extend in such directions relative to the conveyor movement as to simplify materially the structure needed to coordinate the functions and provide automatic feeding of the sheets and envelopes into conveyor cooperating position.

It is still another object of the invention to provide an improved starting control for timing the starting of sheets and/or envelopes and maintaining the feed once started.

In connection with the immediately foregoing object it is a feature of the invention that the feed control includes two feeler operated switches, a feed stop switch and a feed hold switch, governing the movement of the sheet, and means so controlled thereby that the intermittently operated starting mechanism will not be allowed to cease advancing a sheet until the feed hold switch is unoperated at the same time that the feed stop switch is operated.

A further object of the invention is the provision of a novel quick acting clutch release mechanism including a helical spring brake band operating on a brake drum connected with one end of a helical spring clutch.

A still further object of the invention is the provision of improved means including an oscillating pusher for controlling the movement of a sheet-like workpiece and for rapidly positioning the same in a desired location.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings, wherein.

Figure 1:
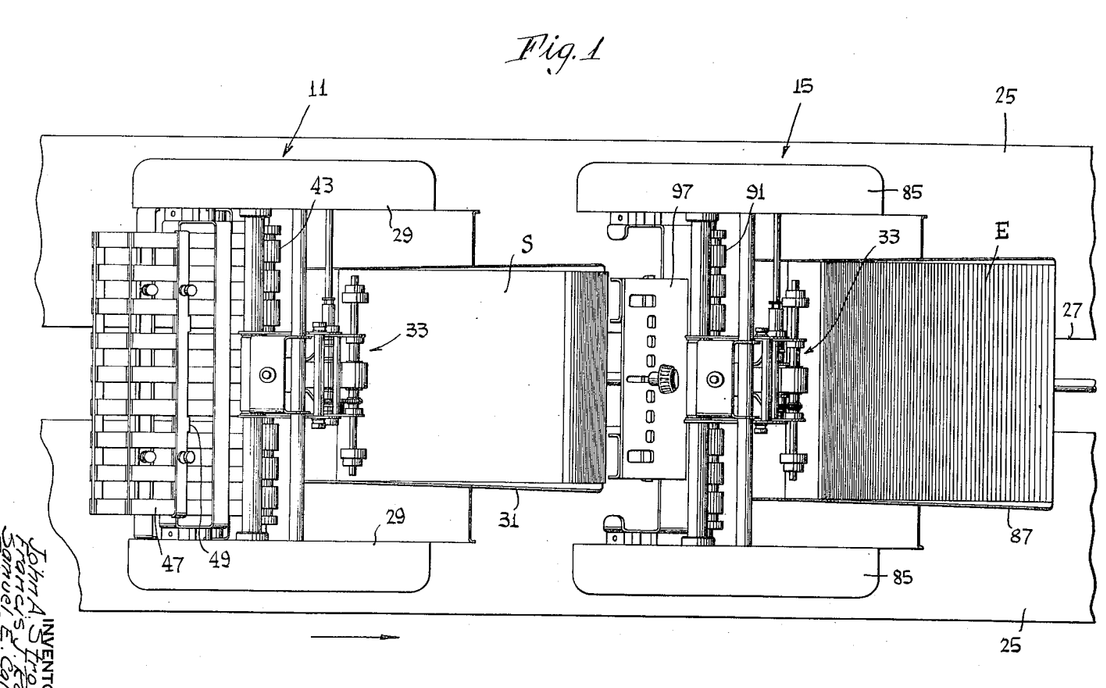
Fig. 1 is a plan of a mailing material handling and treating machine according to the present invention.
Figure 2:
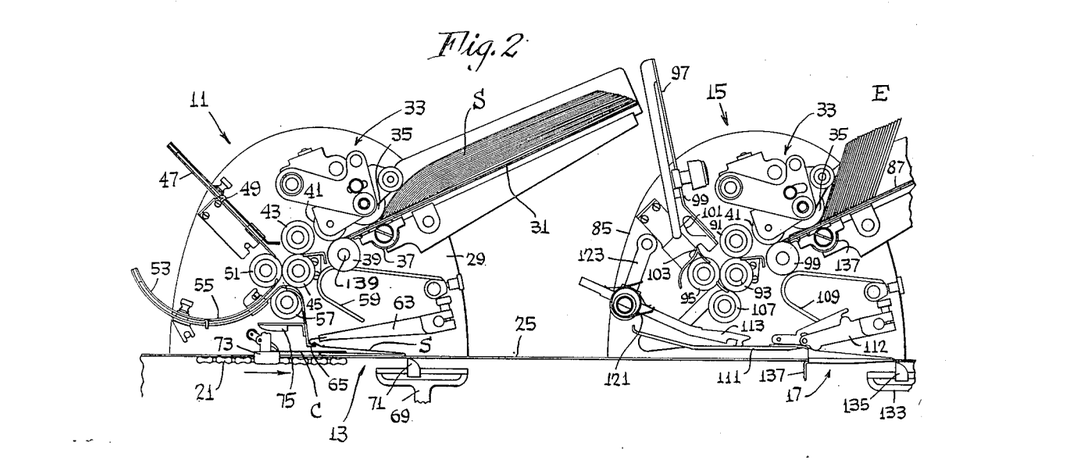
Fig. 2 is a side elevation of the device of Fig. 1, illustrating the same with the end plate removed, and with the base portion and included mechanism omitted, except for parts necessary to show relative positioning.
Figure 13:
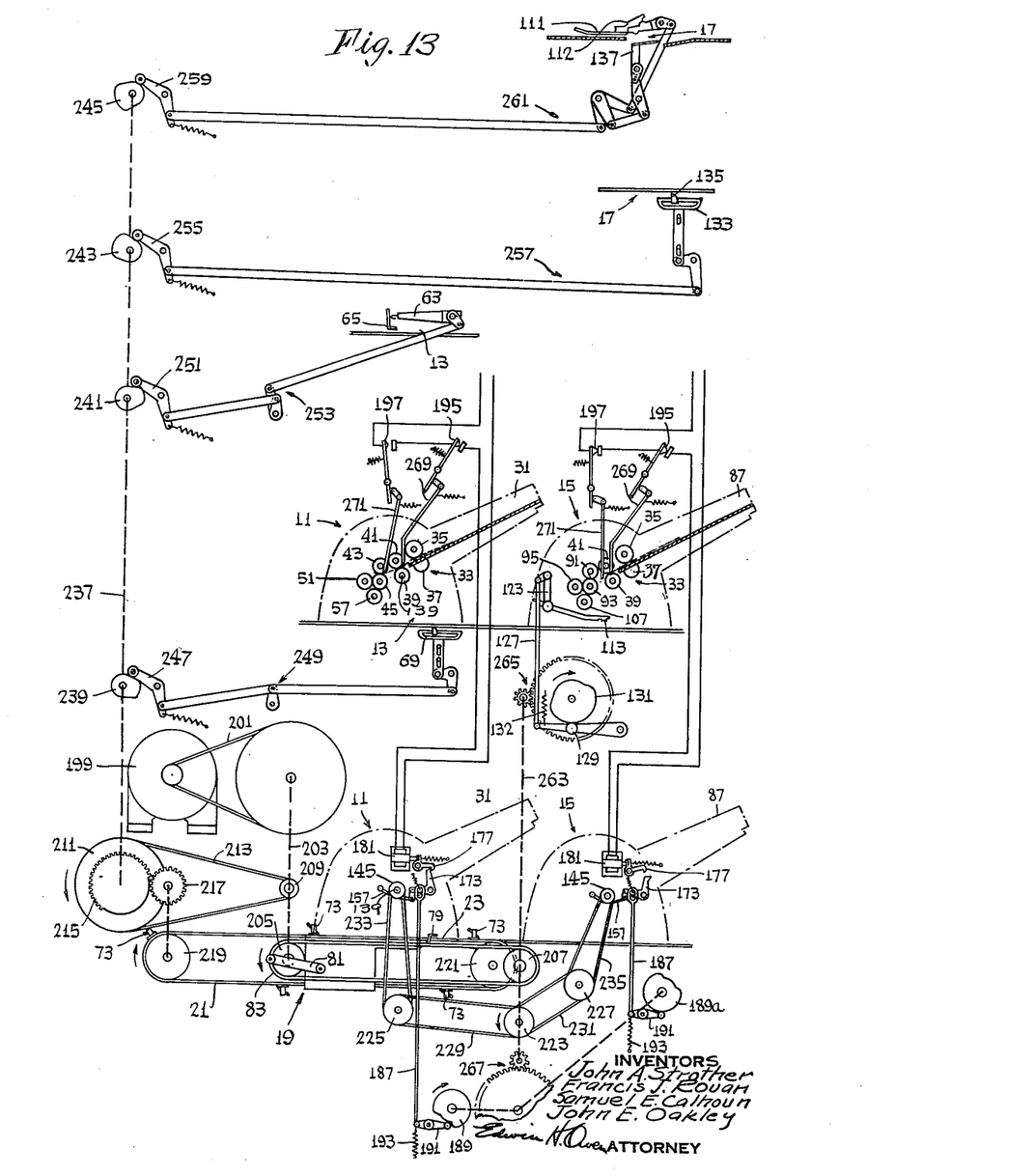
Fig. 13 is a diagrammatic view of the device of Figs. 1 and 2 illustrating the interconnections between the parts and the coordinating means which provide for joint and cooperative functioning of the devices shown in the other views.

Referring to the drawings, and especially Figs. 1, 2 and 13, the present invention includes a means 11 for taking sheets of mailing material one by one from a supply, folding each of a series of sheets and presenting them one by one at a ready station 13, a means 15 for taking envelopes one by one from a supply, opening the flap of each, and presenting it, spread for reception of mailing material, at a ready station 17, a conveyor means 19 moving in a generally horizontal path beneath the means 11 and 15 and in line with the stations 13 and 17 for taking the folded sheet presented by the means 11 either alone or together with other mailing matter brought up by the conveyor and placing the mailing material in the envelope presented by means 15. The conveyor means 19 preferably includes a chain or belt portion 21 which carries the material to a position near the waiting envelope, and a reciprocating ram 23 which takes the material from the belt portion, projects it into the envelope and ejects the filled envelope ready for sealing.

In Fig. 1 the means 11 and 15 are shown as mounted on a base housing 25 which encloses the drive means for the sheet folding means 11 and the envelope flap opening means 15, the belt portion 21, and the operating means for the ram portion 23 of conveyor means 19. The housing 25 includes an upper central slot 27 through which the material contacting portions of the conveyor means 19 project while the upper surface of the housing may act as a rest and guide for the sheets as they are moved along by the conveyor means 19.

Figure 3:
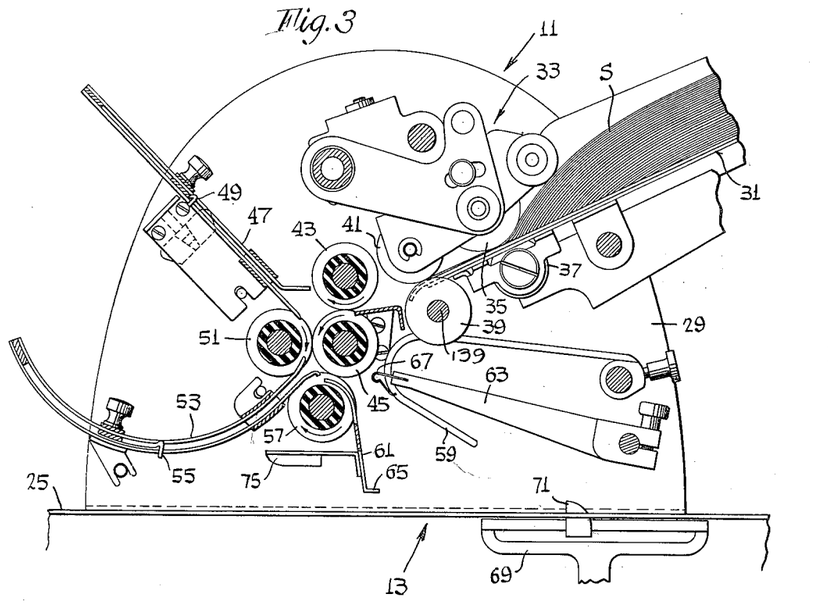
Fig. 3 is an elevational section to a larger scale taken through the sheet folding portion only of the device of Fig. 1.

Fig. 3 illustrates in detail the sheet folding means 11 which comprises side supports 29 carrying between them a supply chute or hopper 31 in which a supply of sheets S to be folded is held. The hopper discharge is adjacent an intermittently driven sheet feeding or starting mechanism 33 which includes a sheet separating roller 35 cooperating with an abutment member 37 which operate in a known fashion to separate one sheet at a time from the supply, and driven by suitable mechanism (not shown) directly from an intermittently driven feeding roller 39 which cooperates with a presser roll 41 for feeding a sheet S rapidly forward once it is separated from the supply in the hopper 31, the rollers 39 and 41 also being considered as a portion of the starting mechanism for the purposes of this description. The sheet S is then taken by continuously rotating rollers 43, 45 and fed into the buckle chute 47 until its leading edge strikes the stop 49. Thereupon the sheet buckles and is caught and creased between the roller 45 and roller 51 which feed the sheet, crease foremost, into the lower buckle chute 53 until the crease strikes the stop 55. The sheet then buckles again and is caught and creased between roller 45 and bottom roller 57, which then feed the folded sheet out, generally towards the right in Fig. 3. It will be noted that this will bring the folded sheet out with its closed crease foremost and the free flap trailing. As the folded sheet emerges it is guided into position between guides 59 and 61, the clamping arm 63 being automatically rocked at that instant to clamp the trailing portion of the folded sheet between the supporting lip 65 and the spring finger 67 at the end of clamp arm 63. To make certain that the folded sheet is not projected beyond its ready station 13 and too far for the lip 65 to catch it, a stop 69 is provided which has an adjustable finger 71 settable for material of various sizes. The stop 69 is in operative position only when the folded sheet is being fed forwardly by the rollers 45, 57, and is automatically retracted downwardly as soon as the sheet is held by clamp 63 against lip 65. With this arrangement it is possible therefore, to set the buckle stops 49, 55 so that the uppermost flap section of the sheet is longer than the other portions of the sheet and trails them slightly. Then the stop finger 71 may be so adjusted that the trailing flap only rests on lip 65 with the remainder of the sheet resting against the upper surface of casing 25. This condition is illustrated in Fig. 2 and indicates the manner in which the device can be used to cause other mailing material C, moved towards the position 13 by the conveyor belt 21, to nest within the folded sheet S.

Figure 9:
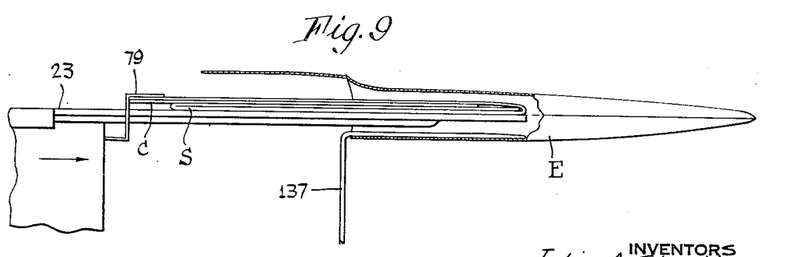
Fig. 9 is a fragmentary elevation to a still larger scale of the envelope filling mechanism in operation.

As seen in Fig. 2, the conveyor belt 21 carries grippers 73 which open automatically due to contact with stationary cams 75 as they approach ready station 13. As the grippers 73 pass through station 13 they close on the edge of folded sheet S and move the latter off the lip 65 and away from the control of clamp finger 67 to a location intermediate the devices 13 and 15. As the gripper reaches this intermediate position it is overtaken by the reciprocatory ram 23 of Figs. 9 and 13. The ram 23, by means of clips 79, grasps the folded sheet S and its nested material C, if any, and moves the same rapidly out of reach of the gripper 73 and towards the waiting envelope E, as in Fig. 9. The ram 23 may be driven by any suitable reciprocating mechanism in timed relation with the movement of the grippers 73 on belt 21, and is shown in Fig. 13 as operated by a link 81 connected to a driving chain 83. The clips 79 may be opened and closed at the proper times, if desired, by a suitable cam arrangement, not shown, in direct response to the reciprocation of the ram. The ram 23 progresses the mailing material C and S horizontally from the above mentioned intermediate position, beneath the device 15 and into the waiting envelope E which has arrived at its ready position 17 in a manner about to be described. The filled envelope E is then further moved by the ram 23 to a position still more to the right while the clips 79, if closed, automatically open to release the matter C and S and the filled envelope E is ejected.

Figure 4:
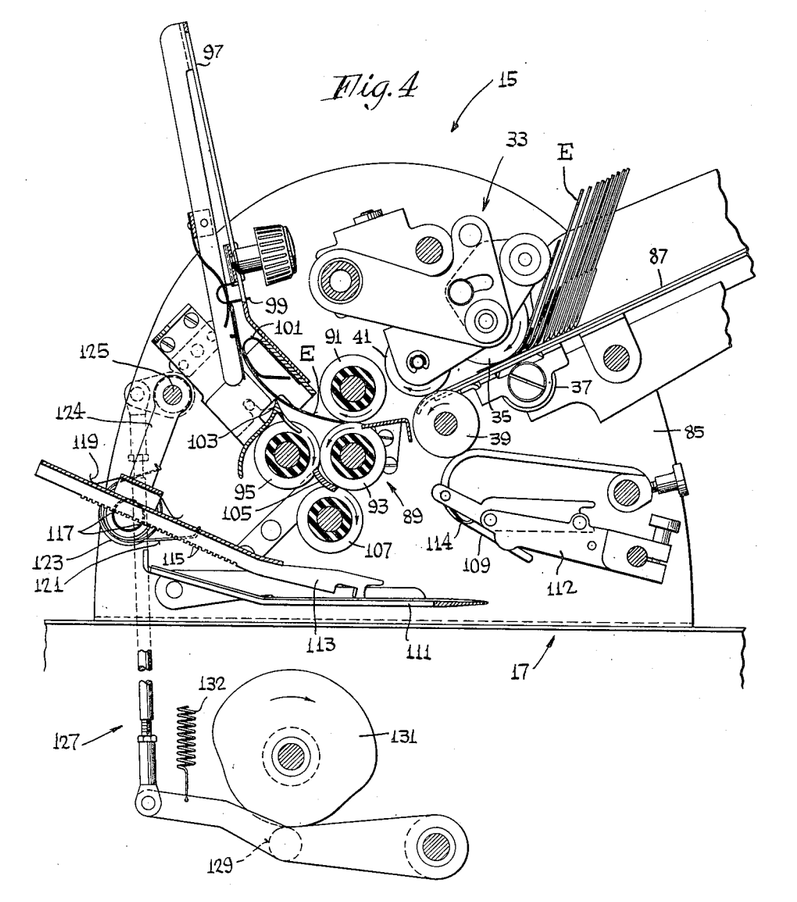
Fig. 4 is an elevational section to the same scale as Fig. 3 of the envelope flap opening portion only of the device of Fig. 1.

Turning now to the envelope opener 15, and with particular reference to Figs. 1 and 4 to 8, it will be seen that the device 15 is illustrated in detail and includes side supports 85 carrying between them a supply chute or hopper 87. The hopper discharge is adjacent an intermittently driven starting mechanism which is in all respects the same as the starting mechanism 33 illustrated in Fig. 3. For this reason the starting mechanism of Fig. 4 is also designated 33 and its parts have been given the same reference characters as used in Fig. 3. In this case, however, the starting mechanism 33 engages a stack of envelopes E as they come from the supplier with the flaps folded against their back surfaces. As seen in Fig. 4 the envelopes are placed in the hopper 87, flap edge downward and front surface towards the separating roller. The discharge of the starting mechanism 33 is adjacent the three roll reversing feed 89, which is made up of the rollers 91, 93 and 95, and feeds each envelope E, as it is separated from the supply, into the nip of the first pair of rollers 91, 93. Mounted between the end supports 85 is a chute 97 with an adjustable end stop 99 into which the envelope E is guided as it leaves the rollers 91, 93. A guide finger 101 engages the face of the envelope as it enters the chute 97 and bends the same in a direction to cause the flap to separate from the envelope body as seen in Fig. 4. A flap trapping guide 103 is provided adjacent the back surface of the envelope and assists in guiding the envelope E into the chute 97. When the stop 99 is struck by the leading edge of the envelope, the stop being set for the width of envelope being used, the trailing edge is carried by the surface of the roller 93 over into the nip of the rollers 93, 95 so that the direction of envelope E is reversed and its withdrawal commences. As the envelope E is withdrawn from the chute 97 by the rollers 93, 95, the flap trapping guide 103 engages under the flap and straightens the same as the envelope is drawn past it. The rollers 93, 95 then iron the envelope crease to hold the flap in straightened position. In addition to the three roll reversing feed 89 there is provided a guide plate 105 and a deflecting roller 107 which cooperate with roller 93 and serve to discharge the envelope in a direction generally towards the right in Fig. 4. The opened envelope is discharged from between the rollers 93, 107, with flap trailing, and front surface uppermost between guides 109 and 111, the latter constituting a platform upon which the envelope E may fall face up to insure the movement of the envelope E into its proper ready position 17. In order that the envelope may be rapidly moved from its position at discharge from rollers 93, 107 to the ready position 17 without danger of loss of control thereover, the device 15 also includes an oscillating pusher 113 which moves back and forth along the table 111 in time with the operation of the mechanism so as to engage the flap edge of a discharged envelope and urge the same toward the right in Fig. 4. In order that the locus of travel of the pusher 113 may be adjusted to the proper position for envelopes of different sizes the pusher is provided with notches 115 along its under surface for engagement with the suitable teeth 117 formed on its supporting sleeve 123 which is rockably mounted on an operating arm 124. A spring 119 presses against the upper surface of the pusher to keep the notches engaged with the teeth except when an adjustment of the effective length of the pusher is being made. A torsion spring 121 is provided for constantly urging the pusher 113 into engagement with the surface of the table 111. As seen in Fig. 4, oscillation of the pusher 113 is effected by swinging the pusher operating arm 124 about its axis 125 by means of a linkage 127 which includes the follower 129 bearing against a cam 131, urged thereagainst by a spring 132, and operated in timed relationship with the operation of the parts of the machine as will hereinafter appear. To make certain that the envelope is not projected beyond its ready station 17 and to retain the envelope so that its flap will remain on and be supported by the edge of the table 111, a stop 133 is provided which has an adjustable finger 135 settable for envelopes of different sizes. The stop 133 is in operative position only when the envelope is being fed forwardly by the rollers 93, 107 and the pusher 113, and is automatically retracted downwardly as soon as the envelope is held by a clamp 112 against the edge of table 111. The clamp 112 is automatically rocked at the proper times to hold the envelope flap against the table 111 and to a retracted position such that the table is cleared to receive another envelope E, and the clamp carries a spring finger 114 so that its grip on the envelope is frictional and readily released when the ram 23 tries to take the envelope away to discharge the same.

As soon as the envelope flap is firmly held between the clamp 112 and the table 111, opening hooks 137 are automatically swung into position just below the bottom of the table 111 and enter the mouth of the envelope E to spread it downwardly in preparation for entry thereof by the reciprocating ram 23 and the mailing matter C and S carried thereby.

Figure 5:
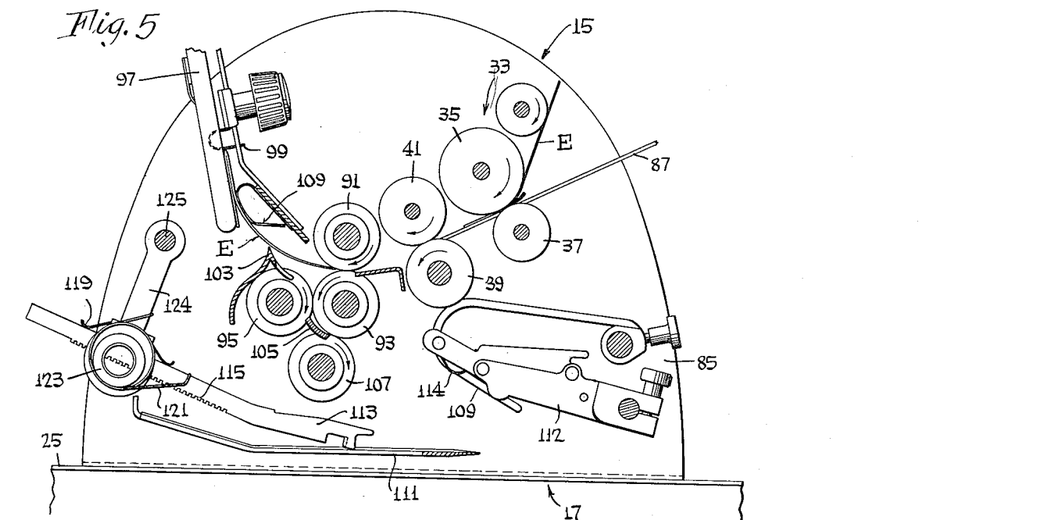
Figs. 5 to 8 are diagrammatic views similar in aspect to Fig. 4, and illustrating the steps in the operation of the device of Fig. 4.
Figure 6:
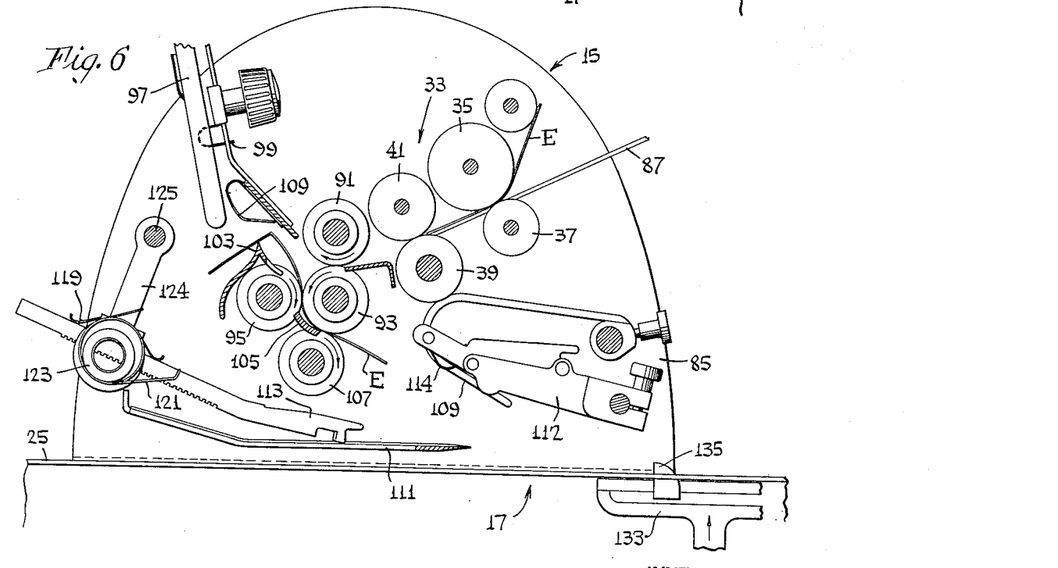
Figure 7:
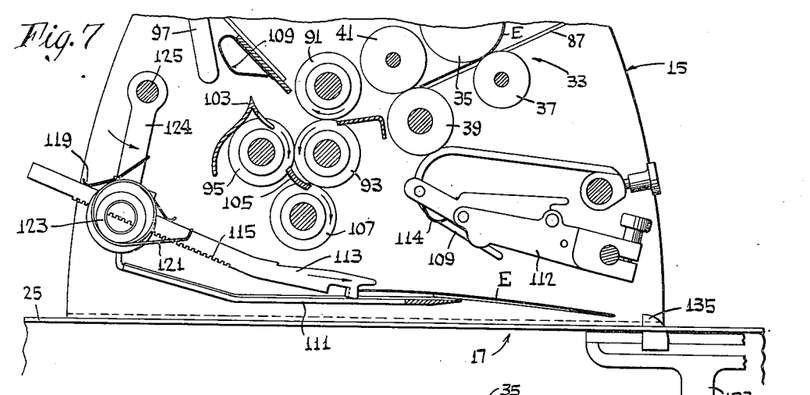
Figure 8:
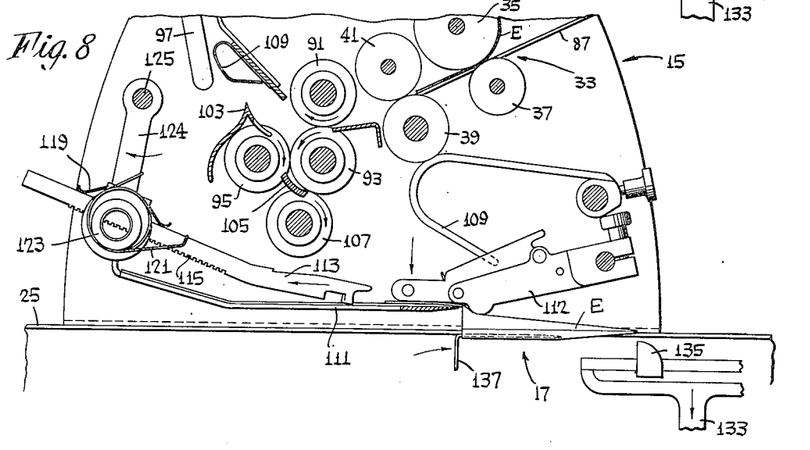

The operation of the flap opener 15 is illustrated in detail in Figs. 5 to 8 in which Fig. 5 shows the envelope E as it strikes the stop 99 in chute 97. In Fig. 6 the motion of the envelope E has been reversed and the flap has been caught by the flap trapping guide 103 while the leading edge of the envelope is being fed forward from between the rollers 93, 107. In both of Figs. 5 and 6 the pusher 113 is being held in its retracted position, but as the envelope with flap opened drops to the surface of table 111 the pusher 113 begins its swing to the right and urges the envelope E into its ready position 17 which the stop finger 135 which has been moving upwardly into position in the meantime. As seen in Fig. 8 the stop 133 is then retracted downwardly and the pusher 113 is also retracted to the left as the clamp 112 engages the envelope flap and firmly holds it against the upper surface of the table 111. At the same time, also as seen in Fig. 8, the opening hooks 137 swing into place and spread the mouth of the envelope. The envelope E is then in readiness to receive the mailing material as it is carried through by the ram 23. The operation of inserting material into the envelope is illustrated to a larger scale in Fig. 9.

As can be seen, especially in Figs. 2 and 13, the hoppers 31 and 87 extend from their respective devices 11 and 15 in the general direction of advancing conveyor travel. This contributes an important factor of simplicity and economy to the machine, for the mailing material is thus fed from the hopper to the ready station 13 or 17 with a smooth flow of the pieces and with a minimum of lost motion. By reference to Fig. 2 it can be seen that the sheet S swings first to the left through the folding chutes 47 and 53, and then to the right and downwardly, with its final motion generally in the direction of conveyor travel. Similar advantage is experienced from the arrangement of the parts of the flap opener 15 wherein the envelopes E swing first to the left and then downwardly to the right and generally in the direction of conveyor travel. If anything, the particular arrangement shown is of even greater benefit to simplification of the structure where the piece is of such a nature that a single orientation only is permissible in its final ready position, as is the case with envelopes E.

Figure 10:
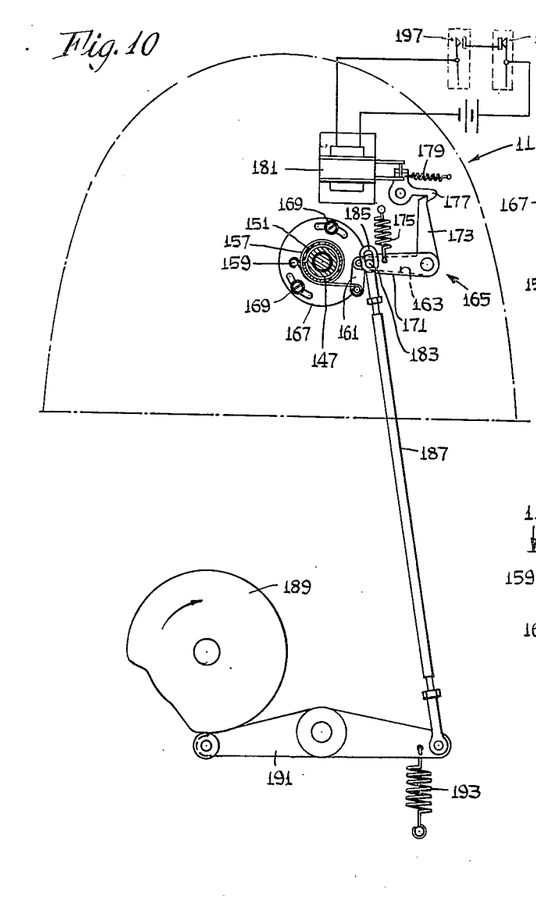
Fig. 10 is a fragmentary side elevation partly in section of the envelope flap opening mechanism with the cover plates removed and illustrating in detail the timing control for starting and stopping the feed, the electrical circuits being diagrammatically illustrated.
Figure 11:
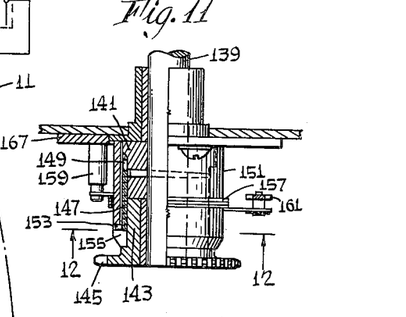
Fig. 11 is a detail view partially in elevation and partially in section taken substantially on line 11—11 of Fig. 12 and illustrating the drive control elements associated with the main feed roller shaft.
Figure 12:
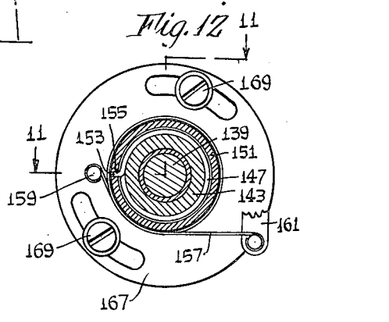
Fig. 12 is a section taken on line 12—12 of Fig. 11 and is a presentation to a larger scale of the sectioned portion of Fig. 10.

Fig. 10 is a fragmentary view of the sheet folder 11 showing the parts necessary to understand the drive of the feed roller 39 and the control over its intermittent operation. Figs. 11 and 12 are auxiliary detail views which are to be contemplated with Fig. 10 to simplify understanding of the operation. It will be understood that the feed of sheets to the folder 11 is controlled primarily by the rotation or nonrotation of the feed roller 39 (Figs. 2 and 3). This roller is mounted on a shaft 139 which carries a clutch element in the form of a friction hub 141 firmly secured thereto. Another friction hub 143 of equal size is rotatable on the shaft 139 and carries an integral sprocket wheel 145 which is continuously driven at a constant suitable speed from any suitable source of power. Surrounding the hubs 141 and 143 is a helical clutch spring 147 which is anchored by its end 149 to the hub 141 and which has a normal configuration such as to grip the hub surfaces with a light frictional contact. The spring 147 is wound in the direction designed to drive the hub 141 from the hub 143 when the latter is rotated in a forward feeding direction, i. e. anticlockwise in Fig. 10. If the clutch spring 147 were allowed to operate without restraint, therefore, a continuous anticlockwise drive of shaft 139 would result. There is provided, however, means to interrupt the clutch operation at certain desired times in order to prevent feeding. This means includes a brake drum 151 surrounding the clutch spring 147. The spring 147 is provided with radially extending tip 153 at its near end which projects into a suitable slot 155 in the drum 151 to prevent relative rotation between the spring and drum. Thus whenever the drum rotation is arrested the tip 153 of the spring 151 is kept from moving and the frictional tendency of the hub 143 is to expand the spring 147 slightly so that it spins idly therein. The drive to shaft 139 and the feed is therefore caused to cease.

In order to stop the rotation of drum 151 there is provided a spring wire brake member 157 anchored at one end to a fixed post 159 and wrapped forwardly about the drum proceeding in an anticlockwise direction. The free end of the brake member is attached to a link 161 which depends from an arm 163 of a brake operating lever assembly 165. The brake member 157 is so formed that it tends to expand to a size larger than the outer brake drum surface and has only point contact therewith, if any, when the lever 163 is in the "brake off" position shown in Fig. 10. When the lever 163 is raised sufficiently to snub the convolutions of brake member 157 about the drum 151, the anticlockwise rotation of the latter causes instantaneous gripping of the drum by the brake band 157 and consequent stopping of the feed. The anchor post 159 is preferably mounted on an adjustable ring 167 which may be swung about the axis of shaft 139 and clamped in various peripheral positions by screws 169 so as to fix the brake application point at a position suited to the normal range of movement of the brake lever assembly 165.

The brake operating lever assembly 165 includes in addition to lever 163, lever 171 and dog 173 which are all integrally connected to move together. A spring 175 engages arm 171 and urges the assembly 165 towards brake applying position. However, movement in this direction is sometimes prevented by a pivoted latch 177 which engages the dog 173 and is urged towards latching position by a spring 179. A solenoid 181, when energized, raises latch 177 against the force of spring 179 to release the dog 173. It will be noted that the arm 171 carries a pin 183 which is slidable in an elongate eye 185 formed at the end of a link 187. The length of the eye 185, when in its normal position, is sufficient to permit movement of the pin 183 as the assembly 165 swings between "brake on" and "brake off" positions. The link 187 can, however, by a lowering movement swing the assembly 165 to "brake off" position by engaging and drawing down on the pin 183 thus starting the feeding operation. Such motion takes place periodically under the control of a timing cam 189 which operates the link through a follower lever 191 in connection with a spring 193 strong enough to maintain the follower against the cam even in opposition to spring 175.

The operation of the solenoid 181 is controlled by a pair of switches 195 and 197 which are in series circuit with the solenoid so that both must be closed to cause energization of the solenoid and consequent lifting of the latch 177. One switch, 195, may be termed for convenience the "feed stop" switch, while the other, 197, may be termed the "feed hold" switch, and each is operated by a sheet contacting feeler finger as will be described hereinafter.

It will be understood that the feed control structure of the envelope flap opening device 15 is the same as that for the sheet folder 11 except that the cam 189a is rotated to operate at a different time from that of the folder cam 189, and therefore no detailed description of the mechanism is deemed necessary. The same parts in subsequent views are all given the same numerals as assigned to Figs. 10 to 12 for the sheet folder 11.

Fig. 13 illustrates particularly the mechanisms which interconnect and coordinate the movements of the conveyor means 19, the sheet folder 11 and the envelope flap opener 15, and is included for the purpose of showing their interrelationship in a simplified manner. Inasmuch as the scale has been materially reduced to combine all parts in one view for ready inspection, and since the showing is made diagrammatic for purposes of ease of comprehension, many details have been omitted from Fig. 13, and the showing of the parts has been simplified to permit reduction to a suitable size and to avoid confusion where overlapping parts are necessary. For example, all of the sprocket chains are illustrated in straight outline, but will be readily understood as having the positive driving properties suited to timing use.

Fig. 13 has also been to some extent exploded for the purpose of clarifying the operation and minimizing overlapping. It will be appreciated, therefore, that a few parts may appear in duplicate in order to indicate their relation to more than one other part. For example, in the lower line devices 11 and 15 are shown with their exterior operating parts exposed, while directly above is a similar showing of the devices 11 and 15 with abbreviated interior views.

As seen in Fig. 13, the motive power for the machine is supplied by a suitable prime mover such as electric motor 199 which drives a main power shaft 203 through a suitable reducing drive 201. The reciprocating chain 83 for the ram 23 is preferably driven at high speed directly by a sprocket 205 on shaft 203 and supported at its other end by another sprocket 207 which it drives. The chain or belt portion 21 of the conveyor means 19, in the preferred form shown, is intermittently driven at a slower speed from shaft 203 by a suitable drive connection here shown as including sprockets 209 and 211, chain 213 and an intermittent drive diagrammatically illustrated by means of gear segment 215 and gear 217 directly connected to the head sprocket or pulley 219 carrying one end of the chain 21. The ratios are so arranged that the sprocket 211 makes one complete revolution for each complete cycle of the ram driving chain 83. The other end of the chain 21 is supported by tail sprocket 221. The parts are so proportioned that exactly one rotation of gear 217 effects movement of the conveyor chain 21 a distance equal to the spacing between grippers 73. Gear segment 215 is designed to cause exactly one revolution of gear 217 for each revolution of itself, and to provide an additional dwell period during which gear 217 is motionless so that one complete revolution of gear segment 215 or of sprocket 211 represents a cycle of operation of the machine. Connected to rotate with the sprocket 207 is a suitable interconnecting means shown as including double sprockets 223, 225 and 227 and interconnecting chains 229 and 231. The starting mechanism 33 of the folder 11 is driven from sprocket 225 by a chain 233 which engages the sprocket 145 thereof and continuously rotates the same. The sprocket 227 drives a chain 235 which engages and continuously rotates the sprocket 145 of the starting mechanism 33 on flap opener 15.

A timing shaft 237, connected to sprocket 211 and rotating once each cycle of machine operation, carries a plurality of cams 239, 241, 243 and 245. The cam 239 is engaged by a spring pressed follower 247 which, through a suitable linkage 249, raises and retracts the stop 69 for the folder 11 at the proper times. The cam 241 is engaged by a follower 251 which operates the clamp 63 of the folder 11 through a suitable linkage 253 to raise and lower the clamp at the proper times. The cam 243 through a follower 255 and linkage 257 similarly moves the stop 133 of the flap opener 11, and the cam 245, through a follower 259 and a linkage 261, moves both the clamp 112 and the envelope opening hook or claw 137 to time their movements properly with respect to other parts of the device.

A secondary timing shaft 263 is shown as driven from the tail sprocket 207 of the ram reciprocating chain 83. Since this sprocket rotates much more rapidly than once each machine cycle, the shaft speed must be geared down to produce a speed equal to that of the timing shaft 237. Hence the cam 131 is related to shaft 263 through suitable gearing 265 which effects its rotation once each cycle to actuate the pusher 113 at the proper time. Driven from the shaft as cam 131, or, as shown in Fig. 13, geared at an equal ratio to shaft 263 as by gearing 267, are cams 189, 189a which actuate the feed starting links 187.

From the foregoing description and by inspection of Fig. 13 it is apparent that the parts are largely mechanically constrained to operate in timed relation to the machine cycle. The only exception to this is the operation of the feed, wherein the position of the sheet or envelope being fed enters into the controlling operation.

It will be noted that the switches controlling the solenoids 181 are each actuated by a feeler finger. Each feed stop switch is associated with a finger 269 which swings between an idle and an operated position, the latter being downstream of the sheet flow from the idle position and beyond the nip of the main feed or pull-out rollers 39, 41. The operated position causes the switch 195 associated therewith to close, both feelers 269 being shown in this position in Fig. 13. It is the position assumed by the feeler 269 whenever the sheet is passing under the tip of the feeler finger. Feelers 271 are associated with the feed hold switches 197 and are located a short distance downstream of the sheet flow from the feelers 269. Their switch operating action is the reverse of that for feelers 269 however, for the idle position causes the associated switch 197 to close as seen in connection with the flap opener 15 in Fig. 13, while the operated position opens the switch 197 as seen in connection with the folder 11.

In operation the electrical control functions subject to the mechanically timed action of the machine as follows, the description being confined for convenience to the folder 11. If a sheet is arrested just ahead of the nip of rollers 39, 41 it waits in this position until the feed is automatically started. The starting position as shown at the folder 11, Fig. 13, is accomplished by the cam 189 which presents its low recess to the follower 191 causing the feed start link 187 to be urged downward. The dog 173 having previously been unlatched, such as in the envelope position 15, Fig. 13, the downward movement of link 187 effects rocking of said dog to an upright or latching position. The brake band 157 is also released, thereby permitting engagement of the clutch and the feeding motion of shaft 139 and roller 39. When the feed hold feeler 271 is engaged and operated by the sheet, the circuit to solenoid 181 is opened, as noted in the upper folder position 11, and the latch 177 is allowed to move to a latching position relative to the dog 173. The duration of the depression in cam 189 is just enough to safely insure that a sheet will have had ample time to reach and operate the feeler 271, whereupon the link 187 is returned to a non-controlling position by the outer cam surface whereby the brake application takes effect within the compass offered by the length of the eye 185, solely under feeler and switch control. The location of the depression in cam 189 is such as to start the feed at an instant which will allow the sheet time for the normal folding operation and bring it down to ready station 13 against the lip 65 in time to be gripped by the automatically closing clamp 63.

So long as the sheet being fed remains in contact with the pull-out rolls 39, 41 it will also hold the feeler 271 in an operated position and thus continue the feed hold switch 197 in an open position. Therefore, the sheet feed continues and advances through the constantly rotating folding rollers 43, 45. The next sheet proceeding from the roller 35 normally moves directly behind the sheet ahead and inasmuch as the roller 39 in cooperation with the presser roll 41 feeds the sheet S rapidly, as previously stated, after it is separated from the supply by the roller 35, the trailing edge of the first sheet will have advanced a considerable distance before the leading edge of the next sheet is advanced to a feeding relation with the rapidly moving rollers 39, 41. Actually, the trailing edge of the first sheet will have passed beyond the feeler fingers 271, thus permitting the switch 197 to close. Said trailing edge having previously passed the feeler finger 269 the switch 195 would now be open. As the next sheet continues to move toward the rollers 39, 41 to be eventually fed thereby, the leading edge of the sheet will engage the feeler finger 269 to effect closing of the switch 195. With both switches 197 and 195 now closed, the solenoid 181 is energized and the latch 177 is disengaged from latching contact with the dog 173. This causes the brake band to be urged by the spring 175 to grip the drum 151 and stop the rotation of roller 39. Feed of the new sheet has thus stopped temporarily, but will begin again when the low recess in cam 189 reaches the follower 191 which results in the release of the brake band and relatching of the dog 173 by the latch 177. For a more detailed description of the structure of the feeding and starting mechanism generally indicated at 33, the same may be found in a copending application, Serial No. 287,139.

The control operation of the flap opening device 15 is identical with that of the sheet folding device 11 except for the timing of the cam 189a with respect to the cycle of the machine, wherefore there is no need for a detailed description and the same is dispensed with.

The machine is shown in Fig. 13 with the conveyor chain 21 commencing its non-moving period, the ram 23 being about to commence its forward conveying stroke. Ready position 13 would be unoccupied and ready position 17 would be occupied by a clamped, opened envelope E ready to receive a sheet S which the ram 23 will pick up from the intermediately positioned gripper 73 on belt 21. Stop 133 is fully retracted in preparation for the ram stroke. No envelope feeding is taking place in flap opener 15, the brake 157 thereof being applied, and the feed awaiting the beginning of the retraction stroke of ram 23 and the retraction of pusher 113. In the sheet folder a feeding period has just commenced with the lowering of the feed starting link 187, the clamp 63 opening in readiness to receive the fed sheet and the stop 69 being about to be raised to a position to arrest the folded sheet.

Figure 14:
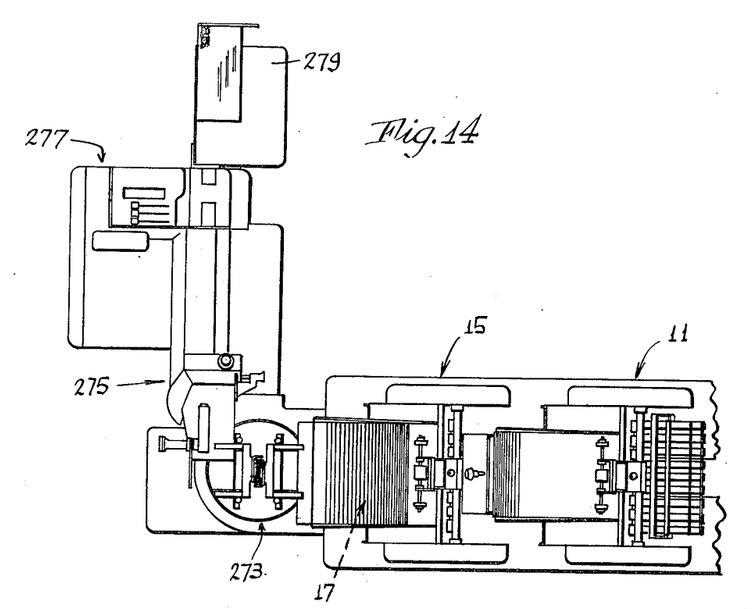
Fig. 14 is a plan of a mailing material handling machine similar to that shown in Figs. 1 and 2, but drawn to a smaller scale, and illustrating additional cooperating mechanism for automatically sealing and stamping the loaded envelopes as they are loaded.

Turning now particularly to Fig. 14, it will be seen that the invention also comprehends a novel method for treating mailing material, and Fig. 14 has been included to illustrate in a general way the operation of the mechanism in carrying out the combination method. It will be seen that Fig. 14 shows the means 15 for opening an envelope flap and placing the envelope in a predetermined receiving position (position 17 of Fig. 2) in addition to the means 11 for folding a sheet and (in cooperation with means 19, Fig. 13) depositing the same in the opened envelope. A transfer means 273 is driven mechanically in timed relation from means 11, 15 and operates to take an envelope, each time one is filled, and move the same into the continuously operating feed section 275 of an envelope closing, sealing and postage printing machine 277 which ejects the completed envelope, ready for mailing, into its stack receiving tray 279. The details of the postage printing machine 277 form no part of the present invention and hence are not described herein. Likewise the specific details of the transfer mechanism 273 form no part of the present invention, but a complete description is presented in the application of Francis J. Rouan and John A. Strother, Serial No. 263,384 filed December 26, 1951.

The method of the invention is characterized by the substantially simultaneously folding of a sheet at 11 and opening of an envelope flap at 15, the holding and spreading of the opened envelope (at position 17) and the moving of the folded sheet to and placing it in the envelope at said position (by the means 19). Additional methods performed according to the present invention involve continuously loading a series of envelopes each with a simultaneously folded sheet as aforesaid, but also subjecting each loaded envelope to a closing and/or stamping procedure (performed by means 277) at substantially the same time that a subsequent envelope is being loaded at position 17. It will be seen, therefore, that a novel order and arrangement of sheet and envelope treating steps has been devised which provides for extremely expeditious handling of mailing matter and the extraordinarily rapid conversion of stacked unfolded sheets, and closed envelopes into a stack of complete stamped, closed letters ready for mailing.

From the foregoing description it is apparent that according to this invention there has been provided, in addition to the above stated methods, a particularly novel and beneficial organization of a sheet folding means, an envelope flap opening means, means to insert the folded sheet in the opened envelope, and coordinating means for bringing about the concerted action of all the other means. In addition a new and improved clutch operating action and new and improved timing control for sheet delivery have been provided, as well as a novel positioning control arranging envelopes or other sheet-like members in a desired location.

Having described the invention, what is claimed is:

1. In a device of the type described, conveying means movable in one direction including a conveyor belt having grip means for engaging flat articles and for conveying them edgewise seriatim in a horizontal path and a reciprocating ram for taking the articles from the grip means and for placing them in an envelope positioned at a loading station in the path; mechanism operated coordinately with said conveying means disposed above said belt for taking sheets one-by-one from a sheet supply, folding them and for positioning a folded sheet issuing from said mechanism in a predetermined location in said path for engagement by said grip means; an envelope flap opening element; mechanism operated coordinately with said conveying means and said first-mentioned mechanism disposed adjacent said path at said loading station for effecting the feed of envelopes one-by-one into and out of the opening element from an envelope supply and extending their flaps to open position during the movement of the envelope out of the opening element, and including means for transferring each opened envelope to loading position in said path and for holding the mouth of said envelope open for entrance by the folded sheet under the control of said ram.

2. In a device of the type described, a four roll buckle type folder having a starting feed roller and continuously rotating folding rollers; a hopper for maintaining a supply of sheets in contact with the starting roller; a conveyor traveling forwardly in a generally horizontal direction beneath said folder and having a sheet engaging means, said folding rollers being arranged to discharge a folded sheet generally in the forward direction; a retractible stop for arresting forward movement of said sheet in the proper position for engagement by a sheet engaging means; means to position said stop in sheet arresting position after passage of a sheet engaging means beneath the folder and for retracting said stop at the approach of a sheet engaging means into contact with a folded sheet engaging the stop; means to cause a single feeding operation of said starting feed roller for each forward passage of a sheet engaging means beneath said folder; and means to insert each folded sheet into an envelope after it is engaged by the engaging means.

3. In a device of the type described, a four roll buckle type folder having a starting feed roller and continuously rotating folding rollers; a hopper for maintaining a supply of sheets in contact with the starting roller; a conveyor travelling forwardly in a generally horizontal direction beneath said folder and having sheet engaging means, said folding rollers being arranged to discharge a folded sheet generally in the forward direction; a retractable stop for arresting forward movement of said sheet in the proper position for engagement by a sheet engaging means; means to position said stop in sheet arresting position after passage of a sheet engaging means beneath the folder and for retracting said stop at the approach of a sheet engaging means into contact with a folded sheet engaging the stop; a guide member positioned rearwardly of a discharged folded sheet and including a lip for catching and retaining the uppermost rearward edge of the folded sheet against fully moving into the conveyor path while the sheet is against the stop to thereby provide a rearwardly opening pocket into which articles to be nested with the folded sheet may be inserted; means to cause a single feeding operation of said starting feed roller for each forward passage of a sheet engaging means beneath said folder; and means to insert each folded sheet into an envelope after it is engaged by the engaging means.

4. In a device of the type described, a four roll buckle type folder having a starting feed roller and continuously rotating folding rollers; a hopper for maintaining a supply of sheets in contact with the starting roller; a conveyor travelling forwardly in a generally horizontal direction beneath said folder and having sheet engaging means, said folding rollers being arranged to discharge a folded sheet generally in the forward direction; a retractable stop for arresting forward movement of said sheet in the proper position for engagement by a sheet engaging means; means to position said stop in sheet arresting position after passage of a sheet engaging means beneath the folder and for retracting said stop at the approach of a sheet engaging means into contact with a folded sheet engaging the stop; a guide member positioned rearwardly of a discharged folded sheet and including a lip for catching and retaining the uppermost rearward edge of the folded sheet against fully moving into the conveyor path while the sheet is against the stop to thereby provide a rearwardly opening pocket into which articles to be nested with the folded sheet may be inserted; means to resiliently clamp said edge of the folded sheet against said lip to hold the sheet in place after retraction of said stop, and to permit withdrawal of the sheet when engaged and moved by the sheet engaging means; means to cause a single feeding operation of said starting feed roller for each forward passage of a sheet engaging means beneath said folder; and means to insert each folded sheet into an envelope after it is engaged by the engaging means.

5. In a device of the type described, an envelope flap opener having a starting feed roller, a continuously operating three roll reversing feed and a flap trapping chute; a hopper for maintaining a supply of envelopes in contact with the starting roller, said reversing feed rollers being arranged to discharge an envelope bottom edge foremost generally in the forward direction; means below said flap opener for receiving envelopes one-by-one from said reversing feed in a horizontal plane including devices for holding and spreading each envelope received including a retractable stop for arresting forward movement of the envelope in a filling position; means for moving flat articles edgewise and forwardly in a horizontal path under said flap opener and into an envelope held by said holding and spreading means and for further moving the filled envelope forwardly in said path to ejected position; means to position said stop in envelope arresting position prior to feeding of an envelope from said rollers and for retracting said stop before filling of the envelope is completed; and means to cause a single feeding operation of said starting feed roller and a single retraction and return of said stop for each envelope filling movement of said article moving means.

6. In a device of the type described, an envelope flap opener having a starting feed roller, a continuously operating three roll reversing feed and a flap trapping chute; a hopper for maintaining a supply of envelopes in contact with the starting roller, said reversing feed rollers being arranged to discharge an envelope bottom edge foremost generally in the forward direction; means below said flap opener for receiving envelopes one-by-one from said reversing feed and for holding and spreading each envelope received including a retractable stop for arresting forward movement of the envelope in a filling position and an oscillating pusher for engaging each envelope as it is discharged by said rollers and moving it edgewise against said stop; means for moving flat articles forwardly in a substantially rectilinear path under said flap opener and into an envelope held by said holding and spreading means and for further moving the filled envelope forwardly in said path to ejected position; means to position said stop in envelope arresting position prior to feeding of an envelope from said rollers and for retracting said stop before filling of the envelope is completed; and means to cause a single feeding operation of said starting feed roller, a single retraction and return of said stop and a single oscillation of said pusher for each envelope filling movement of said article moving means.

7. In a device of the type described, an envelope flap opener having a starting feed roller, a continuously operating three roll reversing feed and a flap trapping chute; a hopper for maintaining a supply of envelopes in contact with the starting roller, said reversing feed rollers being arranged to discharge an envelope bottom edge foremost generally in the forward direction; means below said flap opener for receiving envelopes one-by-one from said reversing feed and for holding and spreading each envelope received including a retractable stop for arresting forward movement of the envelope in a filling position, a flap supporting table, and a resilient retractable clamp for holding the flap against the table and maintaining the envelope in position after retraction of said stop; means for moving flat articles forwardly in a substantially rectilinear path under said flap opener and into an envelope held by said holding and spreading means and for further moving the filled envelope forwardly in said path and out of the grip of said table and clamp to ejected position; means to position said stop in envelope arresting position prior to feeding of an envelope from said rollers and for retracting said stop before filling of the envelope is completed; and means to cause a single feeding operation of said starting feed roller, a single retraction and return of said stop, and a single clamping movement and retraction of said clamp for each envelope filling movement of said article moving means.

8. In a device of the type described, an envelope flap opener having a starting feed roller, a continuously operating three roll reversing feed and a flap trapping chute; a hopper for maintaining a supply of envelopes in contact with the starting roller, said reversing feed rollers being arranged to discharge an envelope bottom edge foremost generally in the forward direction; means below said flap opener for receiving envelopes one-by-one from said reversing feed and for holding and spreading each envelope received including a retractable stop for arresting forward movement of the envelope in a filling position, an oscillating pusher for engaging each envelope as it is discharged by said rollers and moving it edgewise against said stop, a flap supporting table, and a resilient retractable clamp for holding the flap against the table and maintaining the envelope in position after retraction of said stop; means for moving flat articles forwardly in a substantially rectilinear path under said flap opener and into an envelope held by said holding and spreading means and for further moving the filled envelope forwardly in said path and out of the grip of said table and clamp to ejected position; means to position said stop in envelope arresting position prior to feeding of an envelope from said rollers and for retracting said stop before filling of the envelope is completed; and means to cause a single feeding operation of said starting feed roller, a single retraction and return of said stop, a single oscillation of said pusher and a single clamping movement and return of said clamp for each envelope filling movement of said article moving means.

9. In a device of the type described, means movable in one direction for engaging flat articles and conveying them edgewise seriatim in a horizontal path; means for removing each article from the first named means as it approaches a loading station and for placing the article in an envelope positioned thereat; folding mechanism operated coordinately with and independently of said conveying means disposed above said horizontal path for taking sheets one-by-one from a sheet supply, folding them and positioning each folded sheet in a predetermined location in said path for engagement by said conveying means; an envelope flap opening element; mechanism operated coordinately with said conveying means and said folding mechanism disposed adjacent said path at said loading station for effecting the feed of envelopes one-by-one into and out of the opening element from an envelope supply, extending their flaps to open position during the movement of the envelope out of the opening element, transferring each opened envelope to loading position in the conveyor path, and holding the mouth of said envelope open for entrance by the folded sheet engaged by said conveying and placing means.

References Cited in the file of this patent

UNITED STATES PATENTS

| | | |
|---|---|---|
| 1,046,707 | Young | Dec. 10, 1912 |
| 1,090,499 | Poler | Mar. 17, 1914 |
| 1,803,049 | Bouton | Apr. 28, 1931 |
| 1,866,452 | Cogswell | July 5, 1932 |
| 2,024,583 | Kurth | Dec. 17, 1935 |
| 2,301,354 | Alden | Nov. 10, 1942 |
| 2,362,205 | Huck | Nov. 7, 1944 |
| 2,406,006 | Eckhard | Aug. 20, 1946 |
| 2,518,042 | Martell | Aug. 8, 1950 |
| 2,554,573 | Johnson | May 29, 1951 |
| 2,569,219 | Bamber et al. | Sept. 25, 1951 |
| 2,577,181 | Christensen | Dec. 4, 1951 |
| 2,668,053 | Bach | Feb. 2, 1954 |